April 2, 1963   H. J. WOOLSLAYER ETAL   3,083,987
LOW-BED SEMI-TRAILER WITH ATTACHED JACK AND MAT DEVICES
Filed Feb. 16, 1962   4 Sheets-Sheet 3
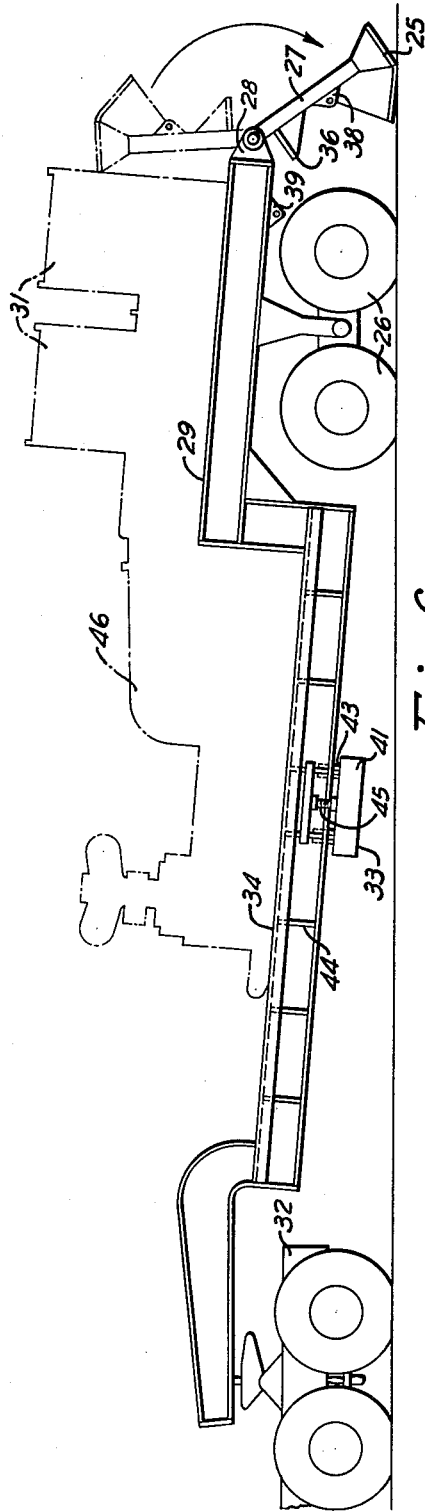
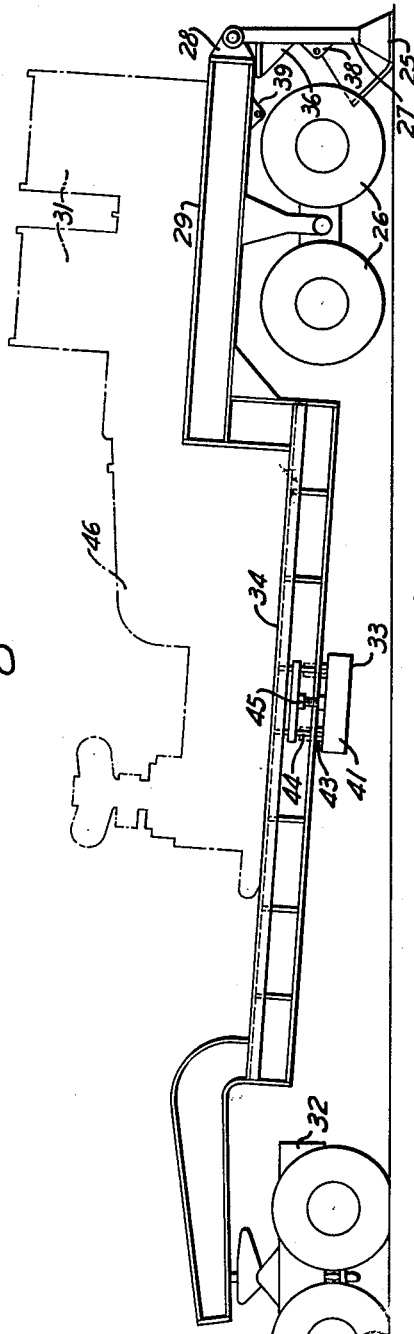
INVENTORS
HOMER J. WOOLSLAYER
CECIL JENKINS
BY JOSEPH R. WOOLSLAYER
Brown, Critchlow, Flick & Peckham
ATTORNEYS

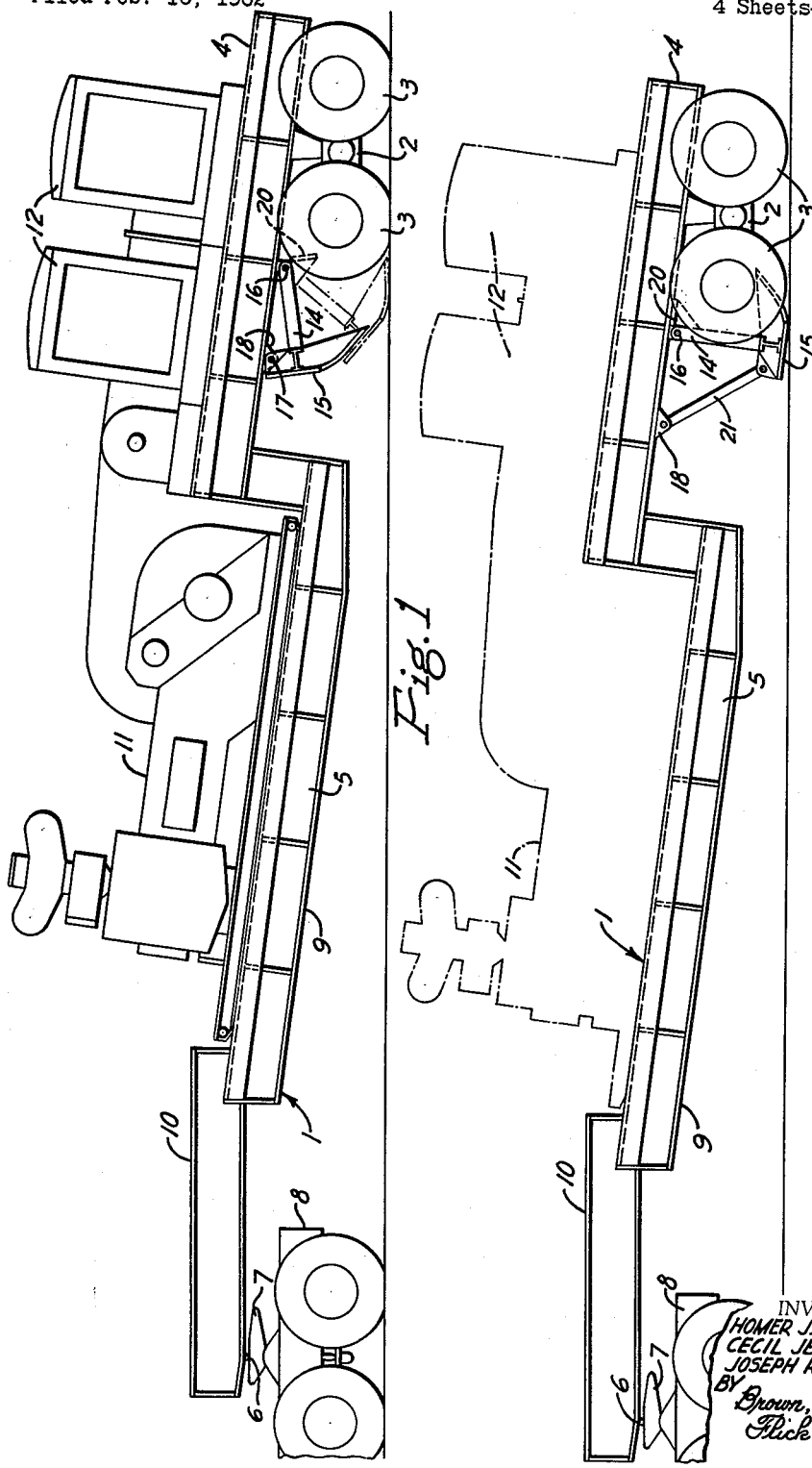

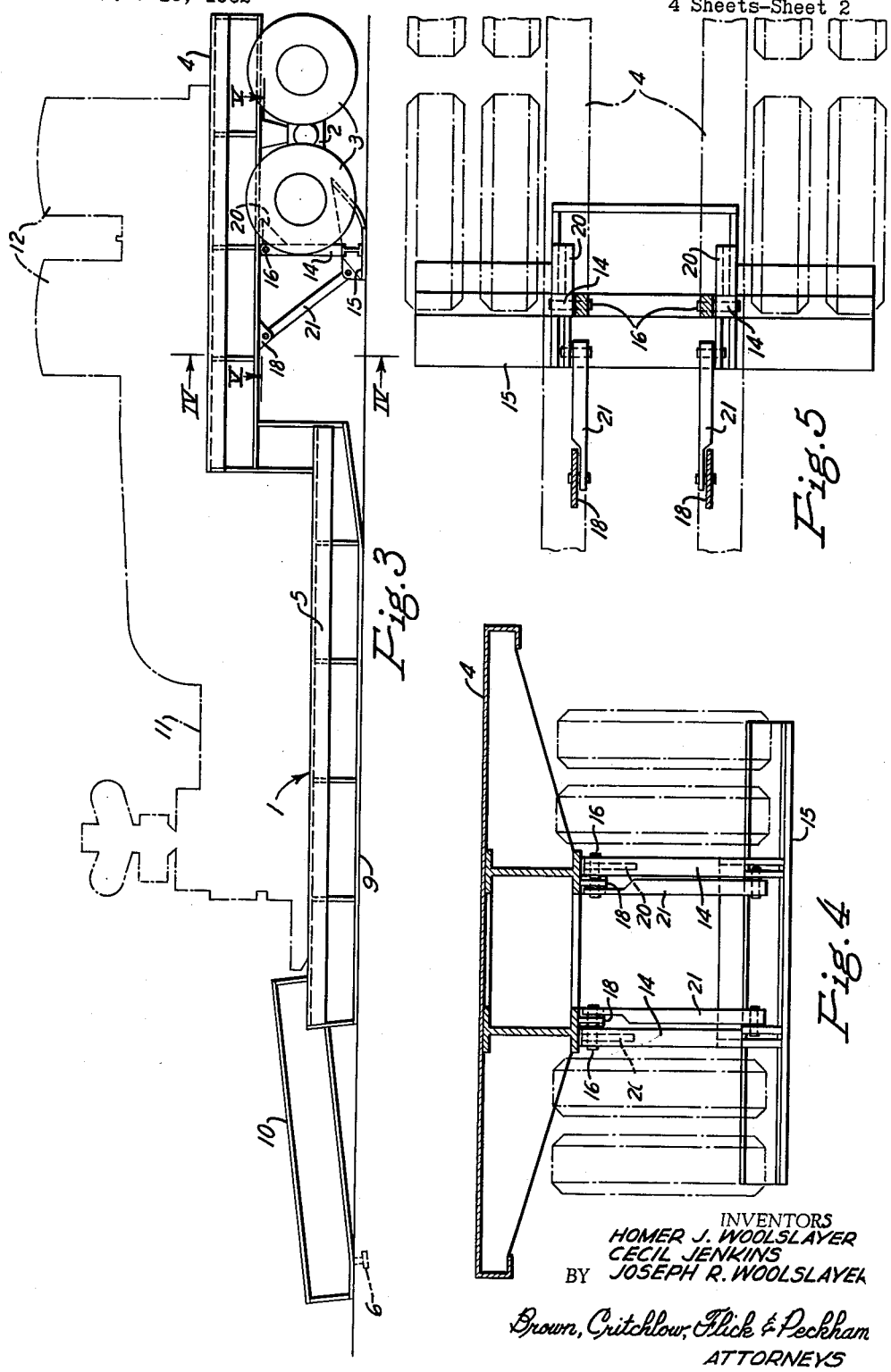

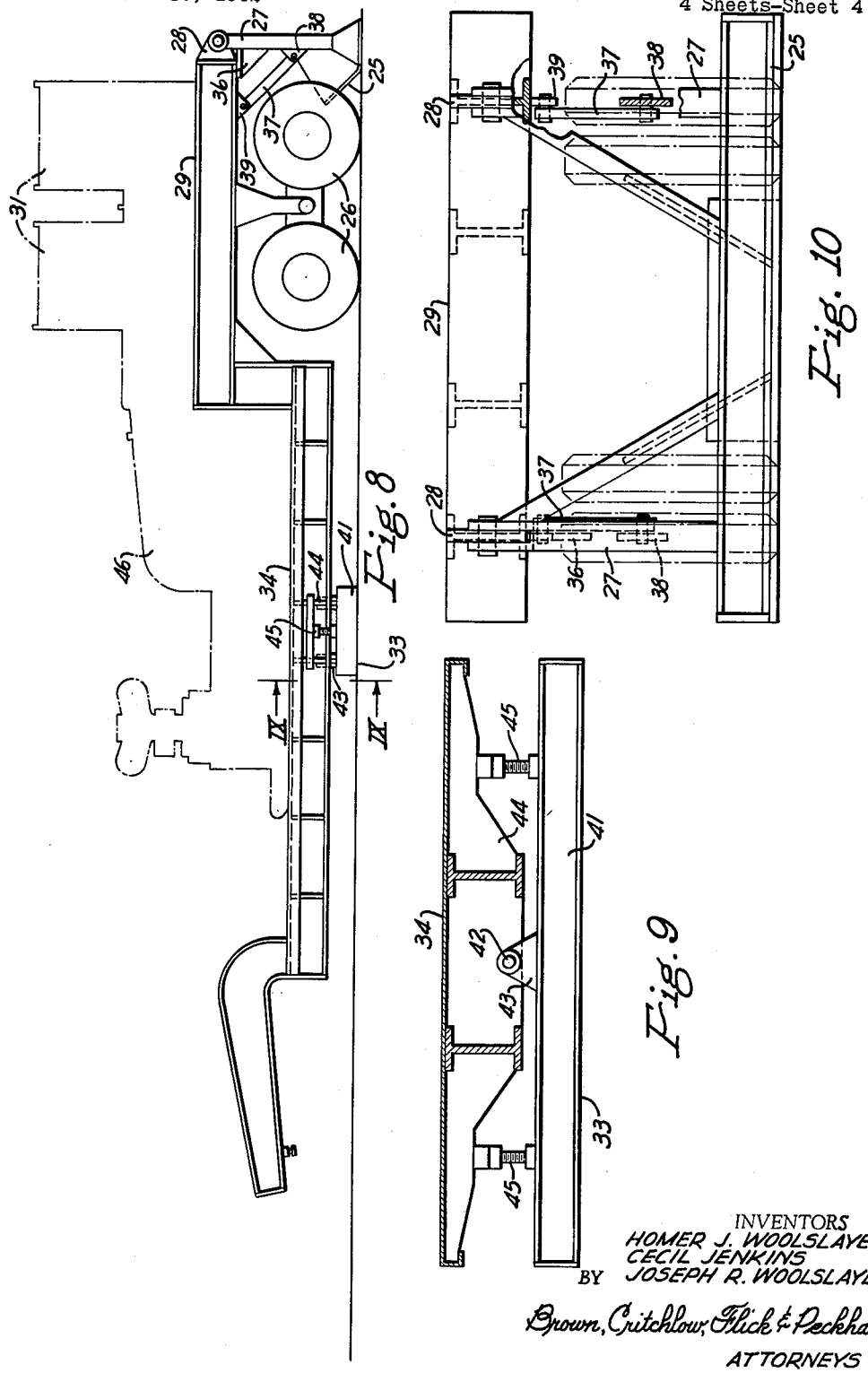

United States Patent Office 3,083,987
Patented Apr. 2, 1963

3,083,987
LOW-BED SEMI-TRAILER WITH ATTACHED JACK
AND MAT DEVICES
Homer J. Woolslayer, Cecil Jenkins, and Joseph R.
Woolslayer, Tulsa, Okla., assignors to Lee C. Moore
Corporation, Pittsburgh, Pa., a corporation of Pennsylvania
Filed Feb. 16, 1962, Ser. No. 173,789
7 Claims. (Cl. 280—423)

This invention relates to semi-trailers, and more particularly to those carrying heavy equipment or machinery that operates while supported by the trailer.

In the oil drilling industry it has been proposed to mount a heavy oil field slush pump and its driving engines on a trailer. The trailer is hauled to the location where the pump is to be used and then the engine and pump are operated without being removed from the trailer. Due to the great weight of this equipment and the strong pulsating motion of the pump, it is necessary that the trailer be supported very solidly. Also, since the slush pump draws fluid from a tank located at ground level or from an excavated pit, it is an aid to hydraulic efficiency to operate the tank with an intake as near ground level as possible. These requirements make it practically impossible to use an ordinary trailer.

It is among the objects of this invention to provide a semi-trailer which can support operating equipment near ground level, which is very solidly supported while that equipment is operating, which does not require auxiliary equipment to solidly support the trailer, and which can quickly and easily be shifted from road position to load foundation position.

In accordance with this invention the semi-trailer has an elongated frame with front and rear portions separated by a depressed central portion. The rear portion is supported by wheels, while the front portion carries means for detachably connecting the trailer to a tractor. The central portion of the frame is inclined forward and upward from a point below the front end of the rear portion while the trailer is being hauled. The bottom of the trailer at the inclined central portion has a substantially flat bearing surface. Legs are pivotally suspended from the rear portion of the frame on a transverse axis and can be swung from a lower operative position up to an inoperative position. Secured to the free ends of the legs is a mat that has a bearing surface engageable with the ground only when the mat is lowered by the legs. The part of the mat bearing surface to first make contact with the ground is disposed at an angle to the legs. The remaining part of that surface is flat and substantially perpendicular to the legs. The legs are long enough for only the angular part of the mat bearing surface to engage the ground when they are swung down to an inclined position, whereby when the trailer is moved a predetermined distance by a tractor to move its wheels toward the mat, the rear end of the trailer will be raised by the legs as their upper ends are moved by the trailer and rock the mat in the same direction. The trailer is rocked down when the front end of the trailer is lowered after being released from the tractor, to cause the trailer bearing surface to rest on the ground while the load on the wheels is transferred to the mat.

The invention is illustrated in the accompanying drawings, in which

FIG. 1 is a side view of our trailer in road position;

FIG. 2 is a side view after the mat has been lowered to the ground and the trailer has been pulled forward far enough to raise its rear end;

FIG. 3 is a side view of the trailer after its central portion has been lowered to the ground;

FIG. 4 is an enlarged vertical cross section taken on the line IV—IV of FIG. 3;

FIG. 5 is an enlarged fragmentary horizontal section taken on the line V—V of FIG. 3.

FIG. 6 is a side view of a modified trailer, showing the mat resting on the ground;

FIG. 7 is a side view after the trailer has been pushed back far enough to raise its rear end;

FIG. 8 is a side view after its central portion has been lowered to the ground;

FIG. 9 is an enlarged vertical cross section taken on the line IX—IX of FIG. 8; and FIG. 10 is an enlarged rear end view of the trailer as shown in FIG. 8.

Referring to FIG. 1 of the drawings, the trailer has a long frame 1, the rear end of which is supported in conventional manner by a wheel suspension unit 2 supported by tandem wheels 3. The rear portion 4 of the frame extends forward some distance beyond the wheels and then is provided with a step down to a depressed central portion 5. The front end of the trailer may be provided with a downwardly extending king pin 6 for connecting it to the fifth wheel 7 of the tractor 8 that hauls the trailer, or some other type of connection can be used.

While the trailer is in the road position shown in FIG. 1, its rear portion and central portion slope forward and upward, but with the rear end of the central portion only far enough from the ground to provide the necessary road clearance. The rear and central portions are in substantially parallel planes, and the bottom of the central portion has an inclined substantially flat bearing surface 9 of considerable area. The front portion of the frame may be an inclined continuation of the central portion or, as shown, it may be a horizontal goose neck 10, below the rear end of which the central portion 5 is depressed. For oil field use, a slush pump 11 is rigidly mounted on the central portion of the trailer frame and is operatively connected to driving engines 12 mounted on the back of the trailer. As will be seen, the major portion of the trailer is tilted while it is traveling over a road or field.

It is a feature of this invention that after the trailer has been disconnected from the tractor, the central portion of the trailer can be lowered until its bearing surface 9 rests flat on the ground, while simultaneously the load at the rear end of the trailer is removed from the wheels and transferred to a rigid support. This support is formed from pivoted legs 14 having a large shoe or mat 15 at their lower ends engageable with the ground. The legs are pivotally connected at one end to the bottom of the frame on a transverse axis 16 near the front wheels. In the running position of the trailer, the legs extend forward beneath the frame and have their front ends rigidly secured to the mat 15. This mat normally is suspended by removable pins 17 from brackets 18 secured to the bottom of the frame. In its suspended position, the lower edge of the mat has the necessary road clearance. The ground-engaging or bearing surface of the suspended mat faces toward the front of the trailer, and the upper part of the bearing surface, which extends about halfway down the mat, is substantially flat. The rest or lower part of the bearing surface is angled toward the back of the trailer.

When the trailer reaches the location where the pump is to be used, the mat is disconnected from its supporting brackets 18 and dropped to the ground, as shown in dotted lines in FIG. 1. The legs are of such length that when this is done, only the angled bearing surface of the mat will engage the ground in front of the wheels. This back part of the mat is narrow enough to extend between the wheels at opposite sides of the trailer, as shown in FIGS. 4 and 5. The tractor then is driven ahead very slowly for a very short distance, which causes the rear end of the trailer to be raised by the legs as their upper ends are pulled forward and upward by it. The forward movement of the upper ends of the legs rocks the mat forward with them until stops 20, attached to the upper ends of the legs, engage the bottom of the frame. As shown in FIG. 2 the stops are so located that they will engage the frame as soon as the flat bearing surface of the mat is at substantially the same inclination as the frame bearing surface 9. Also, the legs are of such length that at that time the flat bearing surfaces of the mat and central portion of the frame will be in substantially the same plane. When this position of the mat is reached, it is preferred to brace it there. This can be done by connecting one or more braces 21 to the mat and to the brackets 18 that previously supported it.

The trailer is now ready to be disconnected from the tractor. That is done by driving the tractor away from the trailer, while supporting the front end of the trailer by the tractor winch or its equivalent in a well-known manner. The front end of the trailer then is lowered. As that occurs, the trailer rocks forward and down until the flat bearing surface of the mat and the flat bearing surface 9 of the frame rest flat on the ground as shown in FIG. 3. As the front of the trailer moves downward, the rear end swings upward around the mat as a fulcrum. Since the wheels are behind the vertical legs 14, they are lifted from the ground, or at least relieved of the load that was formerly on them and which now is supported by the legs and mat. The central portion of the trailer frame resting firmly and directly on the ground, forms a solid and low level support for the slush pump that is unaffected by the vibrations of the pump. No jacks are required for relieving the trailer wheels of the weight of the engines. The trailer can be restored to its over-the-road position by merely reversing the procedure just described.

In the modification shown in the remaining figures of the drawings the pivoted bearing mat 25 is located behind the trailer wheels 26 instead of in front of them, and the load is shifted from the wheels to the mat by backing the trailer rather than by pulling it ahead. More specifically, a pair of legs 27 are pivoted on a transverse axis to brackets 28 projecting from the back of the trailer frame 29. The outer ends of the legs support the mat, the bearing surface of which has a flat area perpendicular to the legs and in line with them. When the mat is in engagement with the ground, the rest of its bearing surface extends forward at an angle to the flat area. In its road or traveling position the legs are swung upward so that, as shown in dotted lines, the mat engages the rear engine 31 mounted on the back part of the trailer frame. The mat can be lashed to the engine in any suitable way to hold it up.

When it is desired to place the trailer in an operating position, the mat is swung down to the ground. As shown in FIG. 6, the length of the legs is such that only the angular front part of the mat will rest on the ground at this time, so the legs are inclined. The trailer then is backed carefully by its tractor 32, which causes the upper ends of the legs to be swung backward. This action rocks the mat backward and simultaneously raises the rear end of the trailer frame to relieve the wheels of the load they carried. As soon as the legs reach a vertical position with the flat area of the mat seated on the ground, as shown in FIG. 7, the trailer is stopped. It is then disconnected from the tractor and its front end is lowered to seat its central bearing surface 33 on the ground with the depressed central portion 34 of the frame horizontal, as shown in FIG. 8. The upper ends of the legs may be provided with stops 36 that will be engaged by the bottom of the trailer frame when the back part of the frame is at right angles to the legs. The legs can be held in this position by braces 37 detachably connected to brackets 38 and 39 on the legs and on the bottom of the frame. The mat relieves the back of the trailer of the weight of engines 31. The angular front portion of the mat is narrow enough to extend between the rear wheels of the trailer at its opposite sides, as shown in FIG. 10, but the rest of the mat should be about as wide as the trailer.

Instead of having the central portion 34 of the trailer frame rest flat on the ground, the frame may be constructed so that its central portion will be spaced several inches from the ground when it is parallel thereto. In such a case the bottom of the frame carries a bearing pad 41 that extends the full width of the frame as shown in FIG. 9 and that is suspended by pivot pins 42 extending lengthwise of the frame through pad brackets 43 that straddle a pair of the cross members 44 forming part of the trailer frame. The bottom of the pad forms the central bearing surface 33 of the trailer. Mounted on the opposite end portions of the pad are adjustable stabilizing members, such as screw jacks 45, that engage the frame above them. By adjusting these jacks, the trailer frame can be maintained level even though the ground and bearing pad slope transversely of the frame to some extent. The bearing pad takes the weight of the central portion of the trailer and the pumping equipment 46 supported by it. The mat at the back of the trailer supports that part of the trailer and the engines 31 mounted on it, which drive the pump. The trailer therefore serves as a firm foundation for the pump and engines.

According to the provision of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A semi-trailer comprising an elongated frame having front and rear portions separated by a depressed central portion, wheels supporting said rear portion, means carried by said front portion for detachably connecting the trailer to a tractor that can haul the trailer over the ground, said central portion of the frame being inclined forward and upward from a point below the front end of said rear portion while the trailer is being hauled, the bottom of the trailer at said inclined central portion having a substantially flat bearing surface, legs pivotally suspended from the rear portion of the frame on a transverse axis and swingable from a lower operative position up to an inoperative position, and a mat secured to the free ends of the legs and having a bearing surface engageable with the ground only when lowered thereto by the legs, the part of said mat bearing surface to first make contact with the ground being disposed at an angle to the legs, the remaining part of that surface being flat and substantially perpendicular to the legs, the legs being long enough for only the angular part of the mat bearing surface to engage the ground when they are swung down to an inclined position so that when the trailer is moved lengthwise a predetermined distance by a tractor to move its wheels toward the mat the rear end of the trailer will be raised by the legs as the upper ends of the legs are moved by the trailer and rock the mat in the same direction, and the trailer being adapted to then be rocked down when the front end of the trailer is lowered after being released from a tractor, whereby said trailer bearing surface will rest on the ground and the load on the wheels will be transferred to the mat.

2. A semi-trailer according to claim 1, in which the flat part of said mat extends substantially the full width of the trailer but the curved part of the mat is narrow enough to extend between the adjacent wheels at opposite sides of the trailer while said trailer bearing surface is resting on the ground.

3. A semi-trailer according to claim 1, in which said central and rear frame portions lie in substantially parallel planes, said trailer including bracing means holding said legs substantially perpendicular to said rear portion while said trailer bearing surface is resting on the ground.

4. A semi-trailer comprising an elongated frame having front and rear portions separated by a depressed central portion, wheels supporting said rear portion, means carried by said front portion for detachably connecting the trailer to a tractor that can haul the trailer over the ground, said central portion of the frame being inclined forward and upward from a point below the front end of said rear portion while the trailer is being hauled, the bottom of the trailer at said inclined central portion having a substantially flat bearing surface, a mat detachably suspended from the frame between said central portion and the wheels and having a bearing surface facing forward, the upper part of said mat bearing surface being substantially flat and the lower part being angled toward the back of the trailer, legs extending lengthwise of the trailer and having front ends rigidly secured to the mat opposite its flat bearing surface, means pivoting the rear ends of the legs to the frame on a transverse axis, the legs being long enough for the angled bearing surface of the mat to engage the ground when the legs are swung down to an inclined lower position so that when the trailer is pulled ahead by a tractor its rear end will be raised by the legs as their upper ends are pulled forward and rock the mat forward, and a stop for stopping the forward movement of the upper ends of the lowered legs when the mat is rocked into a position where its flat bearing surface is at substantially the same inclination as said trailer bearing surface, the legs being of a length to hold the inclined flat bearing surface of the mat substantially in the plane of the trailer bearing surface, and the trailer being adapted to then be rocked down onto said flat bearing surface of the mat when the front end of the trailer is lowered after being released from a tractor, whereby said trailer bearing surface will rest on the ground and the load on the wheels will be transferred to the mat.

5. A semi-trailer comprising an elongated frame having front and rear portions separated by a depressed central portion, wheels supporting said rear portion, means carried by said front portion for detachably connecting the trailer to a tractor that can haul the trailer over the ground, said central portion of the frame being inclined forward and upward from a point below the front end of said rear portion while the trailer is being hauled, the bottom of the trailer at said inclined central portion having a substantially flat bearing surface, legs behind the wheels pivotally suspended from the rear end of the frame on a transverse axis and swingable from a lower operative position backward and upward to an inoperative position, and a mat secured to the free ends of the legs and having a bearing surface engageable with the ground when lowered thereto by the legs, the rear part of the lowered bearing surface of the mat being flat and substantially perpendicular to the legs, the rest of the mat bearing surface extending forward at an inclination to the flat part, the legs being long enough for only the front part of the bearing surface of the mat to engage the ground when the mat is first lowered so that when the trailer is backed up by a tractor its rear end will be raised by the legs as the upper ends of the legs are moved backward and rock the mat backward until its flat bearing surface is flat on the ground, whereby the load on the wheels will be transferred to the mat, the legs being of a length to maintain the load on the mat when the trailer bearing surface is lowered to the ground after the front end of the trailer has been released from a tractor.

6. A semi-trailer according to claim 5, including means connected with said frame for holding said legs vertical while said trailer bearing surface is resting on the ground.

7. A semi-trailer comprising an elongated frame having front and rear portions separated by a depressed central portion, wheels supporting said rear portion, means carried by said front portion for detachably connecting the trailer to a tractor that can haul the trailer over the ground, said central portion of the frame being inclined forward and upward from a point below the front end of said rear portion while the trailer is being hauled, a bearing pad beneath the central portion of the frame, means pivotally connecting said pad to the bottom of the frame on an axis extending lengthwise of the frame, adjustable stabilizing members disposed between the frame and pad at opposite sides of said pivotal means, legs pivotally suspended from the rear portion of the frame on a transverse axis and swingable from a lower operative position up to an inoperative position, and a mat secured to the free ends of the legs and having a bearing surface engageable with the ground only when lowered thereto by the legs, the part of said mat bearing surface to first make contact with the ground being disposed at an angle to the legs, the remaining part of that surface being flat and substantially perpendicular to the legs, the legs being long enough for only the angular part of the mat bearing surface to engage the ground when they are swung down to an inclined position so that when the trailer is moved lengthwise a predetermined distance by a tractor to move its wheels toward the mat the rear end of the trailer will be raised by the legs as the upper ends of the legs are moved by the trailer and rock the mat in the same direction, and the trailer being adapted to then be rocked down when the front end of the trailer is lowered after being released from a tractor, whereby said bearing pad will rest on the ground and the load on the wheels will be transferred to the mat.

References Cited in the file of this patent
UNITED STATES PATENTS

| | | |
|---|---|---|
| 1,549,479 | Flower | Aug. 11, 1925 |
| 2,997,315 | Sittel et al. | Aug. 22, 1961 |